(12) United States Patent
Sun et al.

(10) Patent No.: US 12,068,454 B2
(45) Date of Patent: Aug. 20, 2024

(54) ELECTROLYTE AND LITHIUM-SULFUR BATTERY COMPRISING SAME

(71) Applicant: IUCF-HYU (INDUSTRY-UNIVERSITY COOPERATION FOUNDATION HANYANG UNIVERSITY), Seoul (KR)

(72) Inventors: Yang-Kook Sun, Seoul (KR); Hee Min Kim, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 388 days.

(21) Appl. No.: 16/629,236

(22) PCT Filed: Jul. 11, 2018

(86) PCT No.: PCT/KR2018/007841
§ 371 (c)(1),
(2) Date: Jan. 7, 2020

(87) PCT Pub. No.: WO2019/013541
PCT Pub. Date: Jan. 17, 2019

(65) Prior Publication Data
US 2020/0194834 A1    Jun. 18, 2020

(30) Foreign Application Priority Data

Jul. 11, 2017   (KR) .................. 10-2017-0087833
Jul. 10, 2018   (KR) .................. 10-2018-0079793

(51) Int. Cl.
*H01M 10/0567*   (2010.01)
*H01M 4/38*      (2006.01)
(Continued)

(52) U.S. Cl.
CPC ....... *H01M 10/0567* (2013.01); *H01M 4/382* (2013.01); *H01M 4/5815* (2013.01);
(Continued)

(58) Field of Classification Search
CPC .......... H01M 4/13; H01M 4/38; H01M 4/382; H01M 4/5815; H01M 10/052;
(Continued)

(56) References Cited

U.S. PATENT DOCUMENTS 5,882,812 A * 3/1999 Visco ................. H01M 4/13
429/50
6,060,184 A * 5/2000 Gan ................. H01M 10/0567
429/339

(Continued)

FOREIGN PATENT DOCUMENTS

CN        105428634 A  *  3/2016
KR   10-2006-0125852 A    12/2006
(Continued)

OTHER PUBLICATIONS

Author: Ding, et al., Title:"Dendrite-Free Lithium Deposition via Self-Healing Electrostatic Shield Mechanism", J. Am. Chem. Soc. 135, 11, 4450-4456, Feb. 28, 2013 (Year: 2013).*

(Continued)

*Primary Examiner* — Matthew T Martin
*Assistant Examiner* — Jared Hansen
(74) *Attorney, Agent, or Firm* — Maschoff Brennan (57) ABSTRACT

Provided is an electrolyte of a lithium-sulfur battery. The electrolyte of the lithium-sulfur battery may include: a base electrolyte including lithium salt and an organic solvent; and an electrolyte additive, in which the electrolyte additive includes a metal nitrate.

16 Claims, 7 Drawing Sheets

(51) Int. Cl.
  *H01M 4/58* (2010.01)
  *H01M 10/052* (2010.01)
  *H01M 10/0568* (2010.01)
  *H01M 10/0569* (2010.01)

(52) U.S. Cl.
  CPC ..... *H01M 10/052* (2013.01); *H01M 10/0568* (2013.01); *H01M 10/0569* (2013.01); *H01M 2300/0025* (2013.01)

(58) Field of Classification Search
  CPC ......... H01M 10/0567; H01M 10/0568; H01M 10/0569; H01M 2300/0025; H01M 2300/0037; Y02E 60/10
  See application file for complete search history.

(56) References Cited

U.S. PATENT DOCUMENTS

| | | | | |
|---|---|---|---|---|
| 6,797,428 | B1* | 9/2004 | Skotheim | H01M 4/666 429/231.95 |
| 2005/0147886 | A1 | 7/2005 | Mikhaylk | |
| 2005/0147891 | A1 | 7/2005 | Mikhaylik | |
| 2006/0199080 | A1* | 9/2006 | Amine | H01M 10/0569 429/327 |
| 2013/0164635 | A1* | 6/2013 | Schmidt | H01M 4/133 252/502 |
| 2014/0023936 | A1* | 1/2014 | Belharouak | H01M 4/5815 429/188 |
| 2014/0255796 | A1* | 9/2014 | Matsuoka | H01M 10/0568 429/188 |
| 2014/0272604 | A1 | 9/2014 | Lim et al. | |
| 2014/0342209 | A1* | 11/2014 | He | H01M 10/056 429/101 |
| 2015/0340736 | A1 | 11/2015 | Kim et al. | |
| 2017/0018802 | A1* | 1/2017 | Omoda | H01M 4/505 |
| 2017/0301962 | A1 | 10/2017 | Park et al. | |
| 2018/0062201 | A1* | 3/2018 | Zhu | H01M 4/505 |
| 2018/0301739 | A1* | 10/2018 | Park | H01M 10/052 |
| 2019/0051940 | A1 | 2/2019 | Park et al. | |

FOREIGN PATENT DOCUMENTS

| | | |
|---|---|---|
| KR | 10-2006-0125853 A | 12/2006 |
| KR | 10-2014-0073301 A | 6/2014 |
| KR | 10-2014-0104383 A | 8/2014 |
| KR | 10-2016-0037079 A | 4/2016 |
| KR | 10-2016-0077266 A | 7/2016 |
| KR | 10-2017-0067648 A | 6/2017 |
| KR | 10-2017-0133544 A | 12/2017 |

OTHER PUBLICATIONS

By "Electrochemical Series," in CRC Handbook of Chemistry and Physics, 103rd Edition (Internet Version 2022), John R. Rumble, ed., CRC Press/Taylor & Francis, Boca Raton, FL (Year: 2022).*
CN105428634A, Liu et al., "Lithium ion battery negative electrode material and preparation method of lithium sulfide battery", machine English translation retrieved from https://worldwide.espacenet.com/ Date: Aug. 25, 2023 (Year: 2016).*
Barghamadi, Marzieh, et al. "Optimising the concentration of $LiNO_3$ additive in C4mpyr-TFSI electrolyte-based Li—S battery." Electrochimica Acta 222 (2016): 257-263 (Year: 2016).*
Pan, Huilin, et al. "Ammonium additives to dissolve lithium sulfide through hydrogen binding for high-energy lithium-sulfur batteries." ACS Applied Materials & Interfaces 9.5 (2017): 4290-4295 (published Jul. 1, 2016) (Year: 2016).*
KR Office Action for KR Application No. 10-2018-0079793 dated Sep. 30, 2019.
M.N. Obrovac et.al. "Alloy Negative Electrodes for Li-Ion Batteries" Chem. Rev. 2014, 114, 11444-11502, Nov. 17, 2014.
CRC Handbook of Chemistry and Physics, 92 Edition, 2011 pp. 5-80 to 5-89.

* cited by examiner

ELECTROLYTE AND LITHIUM-SULFUR BATTERY COMPRISING SAME

TECHNICAL FIELD

The present invention relates to an electrolyte and a lithium-sulfur battery using the same, and more particularly, to an electrolyte including an electrolyte additive, and a lithium-sulfur battery including the same.

BACKGROUND ART

As the performance of portable electronic devices improves, the consumption of batteries also increases. Further, there is an increasing need for batteries used in various transportation machines, such as electric vehicles, and the importance of medium and large electric storage devices in preparation for large-scale power outages in summer is highlighted. Accordingly, as a secondary battery satisfying the demands, a lithium-sulfur battery has attracted attention.

The lithium-sulfur battery uses a sulfur-based compound having an S-S bond (disulfide bond) as a cathode active material and an alkali metal, such as lithium, or a carbon-based material in which metal ions, such as lithium ions, are intercalated and deintercalated, as an anode active material. When a current density flowing in the lithium-sulfur battery is excessively high, an anode is damaged. Further, a lithium sulfide moves to the anode while being melted in an electrolyte, thereby damaging the anode. Accordingly, a lifespan of the battery is decreased.

Accordingly, research on a lithium-sulfur battery, in which damage to the anode including lithium is suppressed, has been actively conducted.

For example, Korean Patent Application Publication No. 10-2016-0037079 (applicant: LG Chem. Ltd., Application No. 10-2015-0151556)) discloses a lithium-sulfur battery, which includes: an anode including an anode current collector and lithium on the anode current collector; a cathode including sulfur; an electrolyte provided between the anode and the cathode; and an insulation layer between the anode current collector and the lithium, thereby suppressing damage to lithium.

DISCLOSURE

Technical Problem

A technical problem to be solved in the present invention is to provide an electrolyte which suppresses damage to an anode in a lithium-sulfur battery.

Another technical problem to be solved in the present invention is to provide a lithium-sulfur battery, in which a protective layer is formed on a surface of an anode in a lithium-sulfur battery.

Another technical problem to be solved in the present invention is to provide a lithium-sulfur battery, of which a lifespan is extended.

Another technical problem to be solved in the present invention is to provide a lithium-sulfur battery having high efficiency.

The technical problems to be solved in the present invention are not limited to the foregoing.

Technical Solution

In order to solve the technical problem, the present invention provides an electrolyte of a lithium-sulfur battery.

According to an exemplary embodiment, the electrolyte of the lithium-sulfur battery includes: a base electrolyte including lithium salt and an organic solvent; and an electrolyte additive, in which the electrolyte additive may include a metal nitrate.

According to the exemplary embodiment, the electrolyte additive may include at least one of an indium nitrate, a magnesium nitrate, and an aluminum nitrate.

According to the exemplary embodiment, the lithium salt may include at least one of $LiPF_6$, $LiBF_4$, $LiClO_4$, $LiSbF_6$, $LiAsF_6$, $Li(NO_3)_3$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$, LiCl, LiI, and $LiB(C_2O_4)_2$.

According to the exemplary embodiment, the organic solvent may be a non-aqueous organic solvent, and the non-aqueous organic solvent may be at least one of an annular carbonate material, a linear carbonate material, an ether-based material, 1,2-dimethoxyethane, 1,3-dioxolane, and dimethyl sulfoxide.

According to the exemplary embodiment, the annular carbonate material may include at least one of ethylene carbonate, propylene carbonate, butylene carbonate, vinylene carbonate, vinyl ethylene carbonate, and fluoroethylene carbonate, the linear carbonate material may include at least one of dimethyl carbonate, diethyl carbonate, dipropyl carbonate, ethyl methyl carbonate, methyl propyl carbonate, methyl isopropyl carbonate, and ethyl propyl carbonate, and the ether-based material may include at least one of diethylene glycol dimethyl ether, triethylene glycol dimethyl ether, and tetraethylene glycol dimethyl ether.

In order to solve the technical problem, the present invention provides a lithium-sulfur battery.

According to an exemplary embodiment, the lithium-sulfur battery includes: a cathode including a sulfur compound; the electrolyte including the base electrolyte and the electrolyte additive according to claim 1; and an anode including lithium.

According to the exemplary embodiment, the electrolyte additive may include at least one of an indium nitrate, a magnesium nitrate, and an aluminum nitrate.

According to the exemplary embodiment, the electrolyte additive may form a protective layer on a surface of the anode while a charging/discharging operation is performed.

In order to solve the technical problem, the present invention provides a method of manufacturing a lithium-sulfur battery.

According to an exemplary embodiment, the method of manufacturing the lithium-sulfur battery may include: preparing an electrolyte for forming a protective layer, the electrolyte including a base electrolyte including lithium salt and an organic solvent, and an electrolyte additive including a metal nitrate; forming a protective layer on an anode by immersing the anode including lithium in the electrolyte for forming the protective layer; preparing an electrolyte including the electrolyte additive having a lower concentration than a concentration of the electrolyte for forming the protective layer and the base electrolyte; and manufacturing a lithium-sulfur battery by using the electrolyte, the anode formed with the protective layer, and a cathode including sulfur.

Advantageous Effects

The lithium-sulfur battery according to the exemplary embodiment of the present invention includes an electrolyte including an electrolyte additive. The electrolyte additive may include at least one of an indium nitrate, a magnesium nitrate, and an aluminum nitrate. When charging/discharging of the lithium-sulfur battery is performed, the electrolyte additive may form a protective layer on a surface of an anode. Accordingly, damage to the anode including lithium is suppressed, thereby providing the lithium-sulfur battery with an extended lifespan.

Further, according to the exemplary embodiment of the present invention, the electrolyte additive includes a positive ion of which a standard electrode potential value in a lithium battery is included in the range of 1.8 to 2.8 V. Accordingly, it is possible to provide the lithium-sulfur battery in which a decrease width of a capacity value is low even though the number of cycles of the battery increases, and charge/discharge efficiency is improved.

MODE FOR CARRYING OUT THE INVENTION

Hereinafter, an exemplary embodiment of the present invention will be described in detail with reference to the accompanying drawings. However, the technical spirit of the present invention is not limited to the following exemplary embodiments, but may also be implemented in other forms. Rather, the embodiments introduced herein are provided so as to make the disclosed contents be thorough and complete and to fully transfer the spirit of the present invention to those skilled in the art.

In the present specification, when it is said that a constituent element is formed on another constituent element, the constituent element may be directly formed on another constituent element, or a third constituent element may also be interposed between the constituent elements. Further, in the drawings, for effective description of the technical contents, the thicknesses of films and areas are exaggerated.

Further, in various exemplary embodiments of the present specification, although terms, such as "a first", "a second", and "a third", are used for describing various constituent elements, but the constituent elements shall not be limited by the terms. The terms are merely used for discriminating one constituent element from another constituent element. Accordingly, a first constituent element mentioned in a specific exemplary embodiment may also be mentioned as a second constituent element in another exemplary embodiment. Each exemplary embodiment described and illustrated herein includes a complementary exemplary embodiment thereof. Further, in the present specification, the term "and/or" is used as a meaning of including at least one of constituent elements listed before and after.

Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

In the following description of the present invention, a detailed description of known functions and configurations incorporated herein is omitted to avoid making the subject matter of the present invention unclear.

Figure 1:
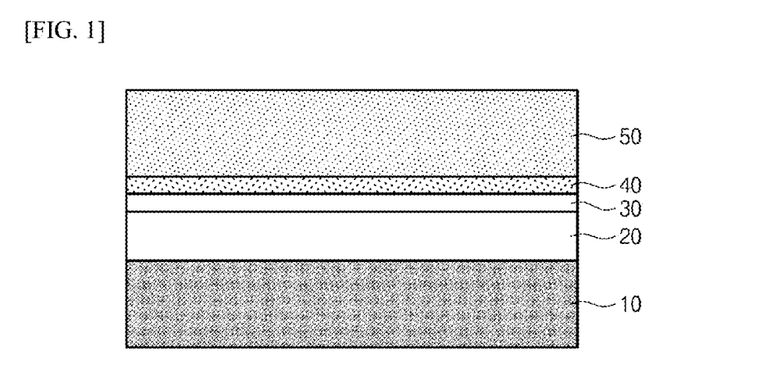
FIG. 1 is a diagram illustrating a lithium-sulfur battery manufactured according to an exemplary embodiment of the present invention.

FIG. 1 is a diagram illustrating a lithium-sulfur battery manufactured according to an exemplary embodiment of the present invention.

Referring to FIG. 1, the lithium-sulfur battery includes a cathode 10, an electrolyte 20, a separation membrane 30, a protective layer 40, and an anode 50.

The cathode 10 may include a sulfur compound and a conductive material. For example, the conductive material may be at least one of graphite (natural graphite, artificial graphite, and the like), carbon black (carbon black, acetylene black, ketjen black, channel black, furnace black, lamp black, summer black, and the like), conductive fibers (carbon fibers, metal fibers, and the like), metal powder (carbon fluoride, aluminum, nickel powder, and the like), conductive whiskey (zinc oxide, potassium titanate, and the like), a conductive metal oxide (titanium oxide and the like), and a conductive material (polyphenylene derivative and the like).

The cathode 10 may be manufactured by mixing the sulfur compound and the conductive material with a binder and a solvent, coating the mixture on a current collector, and drying the mixture. For example, the binder may be a chitosan binder, the current collector may be a conductive material, such as copper (Cu), nickel (Ni), aluminum (Al), or stainless steel, and the solvent may be secondary distilled water.

According to the exemplary embodiment, in the cathode 10, a mixing ratio of the sulfur compound, the conductive material, and the binder may be 6:3:1.

The anode 50 includes lithium. The anode 50 may be formed of a lithium metal or an alloy of lithium and another metal. For example, the anode 50 may include an alloy of silicon (Si), aluminum (Al), tin (Sn), magnesium (Mg), indium (In), vanadium (V), and the like and the lithium (Li).

The electrolyte 20 may include a base electrolyte including lithium salt and an organic solvent, and an electrolyte additive.

The electrolyte 20 may be prepared by adding the electrolyte additive to the base electrolyte, followed by stirring, and the base electrolyte may be prepared by adding the lithium salt to the organic solvent, followed by stirring.

For example, the organic solvent is a non-aqueous organic solvent, and may include at least one of an annular carbonate material, a linear carbonate material, an ether-based material, dimethoxyethane, 1,3-Dioxolane, and dimethyl sulfoxide.

That is, the annular carbonate material may include at least one of ethylene carbonate, propylene carbonate, butylene carbonate, vinylene carbonate, vinyl ethylene carbonate, and fluoroethylene carbonate, the linear carbonate material may include at least one of dimethyl carbonate, diethyl carbonate, dipropyl carbonate, ethyl methyl carbonate, methyl propyl carbonate, methyl isopropyl carbonate, and ethyl propyl carbonate, and the ether-based material may include at least one of diethylene glycol dimethyl ether, triethylene glycol dimethyl ether, and tetraethylene glycol dimethyl ether.

Further, for example, the lithium salt may include at least one of $LiPF_6$, $LiBF_4$, $LiClO_4$, $LiSbF_6$, $LiAsF_6$, $Li(NO_3)_3$, $LIN(SO_2C_2F_5)_2$, $LiN(CF_3\ SO_2)_2$, $LiN(SO_3C_2F_5)_2$, $LiN(SO_2F)_2$, $LiCF_3SO_3$, $LiC_4F_9SO_3$, $LiC_6H_5SO_3$, $LiSCN$, $LiAlO_2$, $LiAlCl_4$, $LiN(C_xF_{2x+1}SO_2)(C_yF_{2y+1}SO_2)$ (in which x and y are natural numbers), LiCl, LiI, and $LiB(C_2O_4)_2$.

According to the exemplary embodiment, the electrolyte additive may include a metal nitrate. For example, the electrolyte additive may include at least one of an indium nitrate, a magnesium nitrate, and an aluminum nitrate.

Further, according to another exemplary embodiment, the electrolyte additive may include a metal compound, and the metal compound may include at least one of Li, Na, Mg, Al, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Sb, Cs, Ba, La, Hf, Ta, W, Re, Os, Ir, Pt, Au, Hg, Tl, Pb, Bi, Po, Fr, Ra, Ac, Si, P, As, Se, and Te as a positive ion, and include at least one of, S, C, I, Br, Cl, and F as a negative ion.

Otherwise, for another example, the positive ion may include at least one of positive ions of which a standard electrode potential value is 1.8 to 2.8 V in a lithium battery.

Otherwise, for another example, the negative ion may include at least one of nitrate ($NO_3^-$), sulfite ($SO_3^{2-}$), carbonate ($CO_3^{2-}$), iodide ($I^-$), bromide ($Br^-$), chloride ($Cl^-$), fluorine ($F^-$), and carboxylate ($COO^-$) positive ions.

The separation membrane 30 may include at least one of glass fiber, olefin-based resin, fluorine-based resin (for example, polyvinylidene fluoride and polytetrafluoroethylene), ester-based resin (for example, polyethylene terephthalate), and cellulosic nonwoven fabric. The separation membrane 30 may be formed of various kinds of materials other than the foregoing examples.

The protective layer 40 may be formed on a surface of the anode 50 in a film form. The protective layer 40 may be a Solid Electrolyte Interphase (SEI) layer. When the lithium-sulfur battery manufactured according to the exemplary embodiment of the present invention is charged/discharged, the electrolyte additive included in the electrolyte 20 may form the protective layer 40 on the surface of the anode 50. The protective layer 40 may prevent the surface of the anode 50 from being damaged due to a high current density when the lithium-sulfur battery is charged/discharged. Further, the protective layer 40 may prevent lithium polysulfide generated by sulfur that is the cathode 10 from moving through the electrolyte 20 and the anode 50 from being damaged.

According to the exemplary embodiment, the protective layer 40 may be formed in the process of manufacturing the lithium-sulfur battery by using the electrolyte 20 including the electrolyte additive and charging/discharging the lithium-sulfur battery, as described above.

Otherwise, according to another exemplary embodiment, the operation of forming the protective layer 40 may be performed before the lithium-sulfur battery is manufactured by using the electrolyte 20. Particularly, for example, the operation of forming the protective layer 40 may include preparing the electrolyte 20 including the electrolyte additive, immersing the anode 50 in the electrolyte 20, and forming the protective layer 40 on the anode 50, and washing and drying the anode 50 formed with the protective layer 40. In the case of Dl, a heat treatment process may be additionally performed after the anode 50 is immersed in the electrolyte 20. Accordingly, the protective layer 40 may be sufficiently formed on the surface of the anode 50.

Otherwise, according to another exemplary embodiment, as described above, when the protective layer 40 is formed before the lithium-sulfur battery is manufactured, the protective layer 40 may be formed by separately preparing an electrolyte for forming a protective layer having a higher concentration of the electrolyte additive than that of the electrolyte 20, and immersing the anode 50 in the electrolyte for forming the protective layer. In this case, the electrolyte for forming the protective layer may include the base electrolyte and the excessive amount of electrolyte additive. Accordingly, the protective layer 40 may be easily formed on the anode 50. In contrast to this, in the case where the electrolyte 20 is prepared by adding the excessive amount of electrolyte additive to the base electrolyte, immersing the anode 50 in the electrolyte 20 to which the excessive amount of electrolyte additive is added, and manufacturing the lithium-sulfur battery by using the electrolyte 20 to which the excessive amount of electrolyte additive is added, even though the protective layer 40 is easily formed, a charge/discharge characteristic of the lithium-sulfur battery may be degraded due to the excessive amount of electrolyte additive. However, as described above, when the electrolyte for forming the protective layer having the high concentration of the electrolyte additive is separately prepared, it is possible to easily form the protective layer 40 and simultaneously optimize the charge/discharge characteristic of the lithium-sulfur battery.

Further, in this case, the electrolyte for forming the protective layer may include the base electrolyte having the same kind as that of the electrolyte 20 and the electrolyte additive. Otherwise, according to a modified example, the electrolyte for forming the protective layer includes the base electrolyte having the same kind as that of the electrolyte 20, in such a manner as to include an electrolyte additive (for example, a magnesium nitrate) making it easy to form the protective layer 40, and the electrolyte may include the base electrolyte and another type of electrolyte additive that has excellent charge/discharge capacity, lifespan characteristic, and thermal stability, and is easily high-speed charged.

The lithium-sulfur battery manufactured according to the exemplary embodiment of the present invention includes the electrolyte 20 including the base electrolyte and the electrolyte additive. When the charging/discharging of the lithium-sulfur battery is performed, the electrolyte additive may form the protective layer 40 on the surface of the anode 50. Accordingly, the damage to the anode 50 including lithium is suppressed, thereby providing the lithium-sulfur battery with an extended lifespan.

Unlike the exemplary embodiment of the present invention, in the case of the lithium-sulfur battery including the electrolyte 20 that does not include the electrolyte additive, the protective layer 40 may not be easily formed. In the case where the protective layer 40 is not formed, in the lithium-sulfur battery, as a current density is increased in the charging/discharging process, the anode 50 may be damaged. Further, lithium polysulfide generated by sulfur that is the cathode 10 moves to the anode 50 through the electrolyte 20, thereby damaging the anode 50. Accordingly, the lifespan of the lithium-sulfur battery may be decreased and instability may be caused.

However, like the exemplary embodiment of the present invention, in the case of the lithium-sulfur battery including the electrolyte 20 that includes the electrolyte additive, the protective layer 40 may be easily formed, thereby suppressing damage to the anode 50 including lithium. Accordingly, it is possible to provide the lithium-sulfur battery with decreased instability and an extended lifespan.

Hereinafter, a particular experimental example of the exemplary embodiment of the present invention and a characteristic evaluation result will be described.

Electrolyte and Lithium-Sulfur Battery According to Example 1

An electrolyte according to Example 1 was prepared by preparing a base electrolyte by adding LiTFSI and LiNO$_3$ as lithium salt to a mixed solvent including dimethosyethane and 1,3-dioxane in a ratio of 1:1 as an organic solvent, followed by stirring at a room temperature, and by adding 0.01 m of indium nitrite as an electrolyte additive to 10 ml of the base electrolyte, followed by stirring.

A cathode having a content of 5 mg/cm$^2$ of sulfur was prepared by mixing sulfur, a carbon conductive agent, and a chitosan binder in a ratio of 6:3:1 in secondary distilled water that is a solvent to prepare the mixture in the form of a slurry, coating the mixture on an aluminum foil that is a current collector, drying the aluminum foil for 24 hours to remove the solvent. A lithium-sulfur battery according to Example 1 was manufactured by using the cathode, the electrolyte, and the lithium foil as the anode.

Electrolyte and Lithium-Sulfur Battery According to Example 2

An electrolyte according to Example 2 was prepared by preparing a base electrolyte by the same method as that of Example 1, and adding 0.01 m of aluminum nitrate as an electrolyte additive, followed by stirring.

Then, a lithium-sulfur battery according to Example 2 was manufactured by using the electrolyte according to Example 2 by the same method as that of Example 1.

Electrolyte and Lithium-Sulfur Battery According to Example 3

An electrolyte according to Example 3 was prepared by preparing a base electrolyte by the same method as that of Example 1, and adding 0.01 m of magnesium nitrate as an electrolyte additive, followed by stirring.

Then, a lithium-sulfur battery according to Example 3 was manufactured by using the electrolyte according to Example 3 by the same method as that of Example 1.

Electrolyte and Lithium-Sulfur Battery According to Example 4

An electrolyte according to Example 4 was prepared by preparing a base electrolyte by the same method as that of Example 1, and adding 0.03 m of magnesium nitrate as an electrolyte additive, followed by stirring.

Then, a lithium-sulfur battery according to Example 4 was manufactured by using the electrolyte according to Example 4 by the same method as that of Example 1.

Electrolyte and Lithium-Sulfur Battery According to Comparative Example 1

A lithium-sulfur battery according to Comparative Example 1 was manufactured without an electrolyte additive, by using a base electrolyte prepared by the same method as that of Example 1, and by using the same method as that of Example 1.

Figure 2:
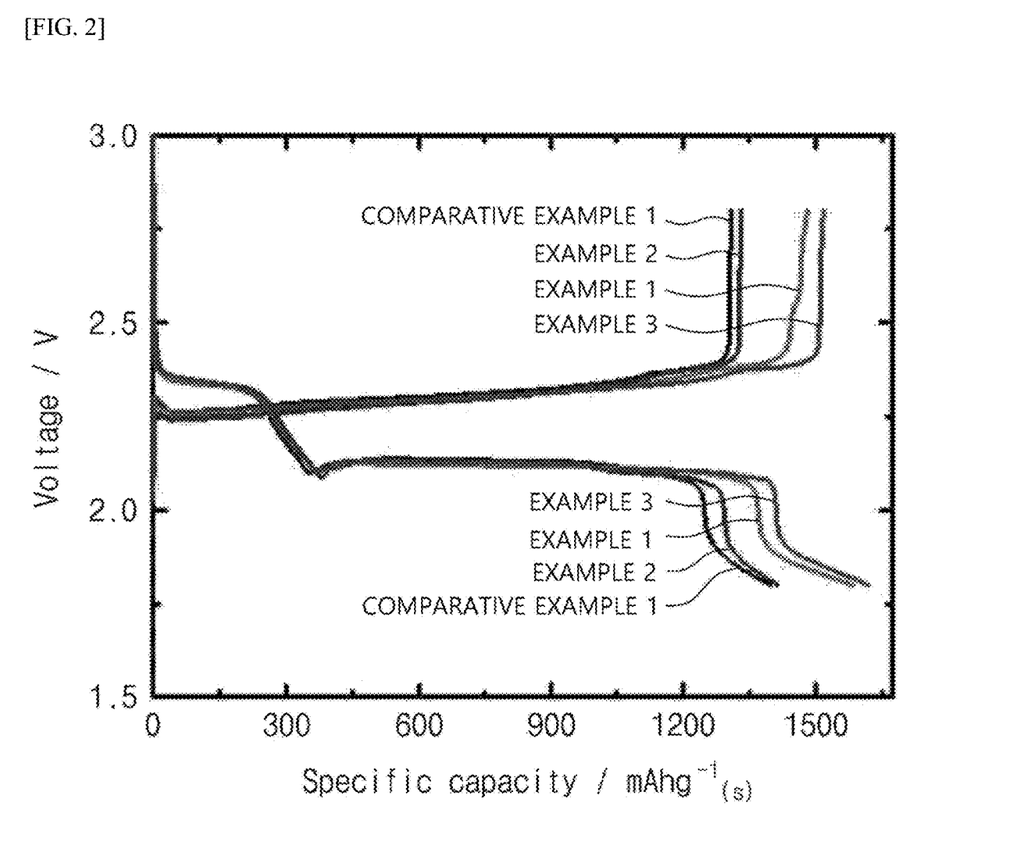
FIG. 2 is a graph of the measurement of discharge capacity characteristics of lithium-sulfur batteries according to Examples 1 to 3 of the present invention and Comparative Example 1.
Figure 3:
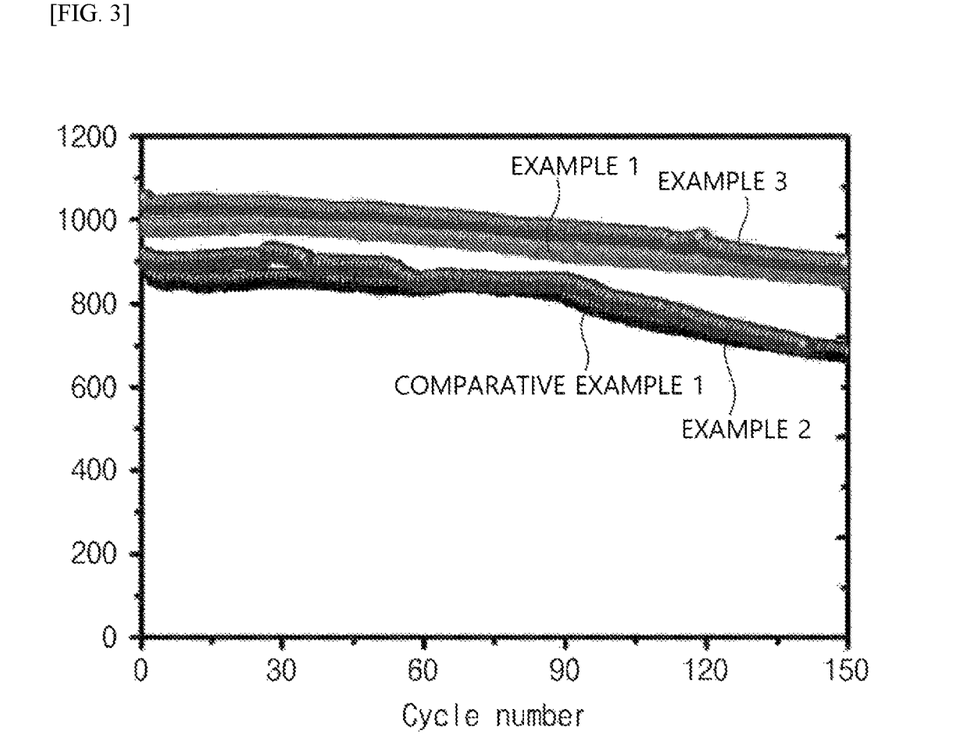
FIG. 3 is a graph of the measurement of lifespan characteristics of the lithium-sulfur batteries according to Examples 1 to 3 of the present invention and Comparative Example 1.

FIG. 2 is a graph of the measurement of discharge capacity characteristics of lithium-sulfur batteries according to Examples 1 to 3 of the present invention and Comparative Example 1, and FIG. 3 is a graph of the measurement of lifespan characteristics of the lithium-sulfur batteries according to Examples 1 to 3 of the present invention and Comparative Example 1.

Referring to FIGS. 2 and 3, discharge capacity characteristics and lifespan characteristics of the lithium-sulfur batteries according to Examples 1 to 3 of the present invention and Comparative Example 1 were measured.

As illustrated in FIGS. 2 and 3, it can be seen that the capacity and lifespan characteristics of the lithium-sulfur batteries including the indium nitrate, the aluminum nitrate, and the magnesium nitrate according to Examples 1 to 3 are excellent than the capacity and lifespan characteristics of the lithium-sulfur battery including the electrolyte that does not include the electrolyte additive (the metal nitrate) according to Comparative Example 1.

Particularly, it can be seen that the lithium-sulfur battery including the electrolyte including the magnesium nitrate according to Example 3 has the higher capacity and the more excellent lifespan characteristic than those of the lithium-sulfur batteries including the electrolytes including the indium nitrate and the aluminum nitrate according to Examples 1 and 2.

Figure 4:
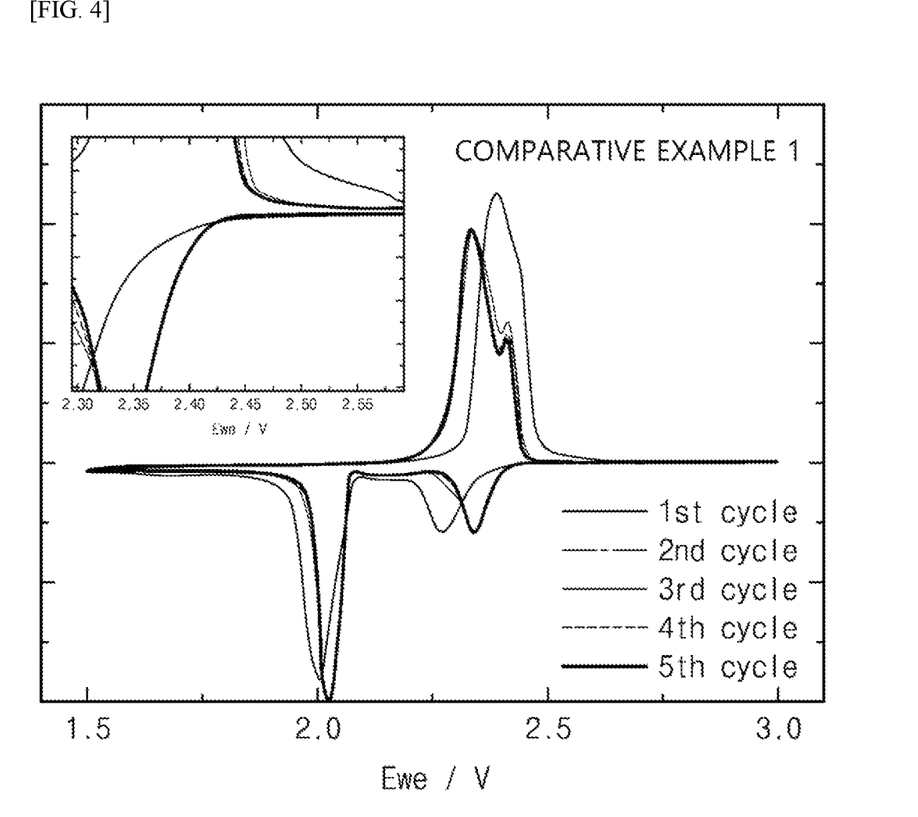
FIG. 4 is a CV graph of the lithium-sulfur battery according to Comparative Example 1.
Figure 5:
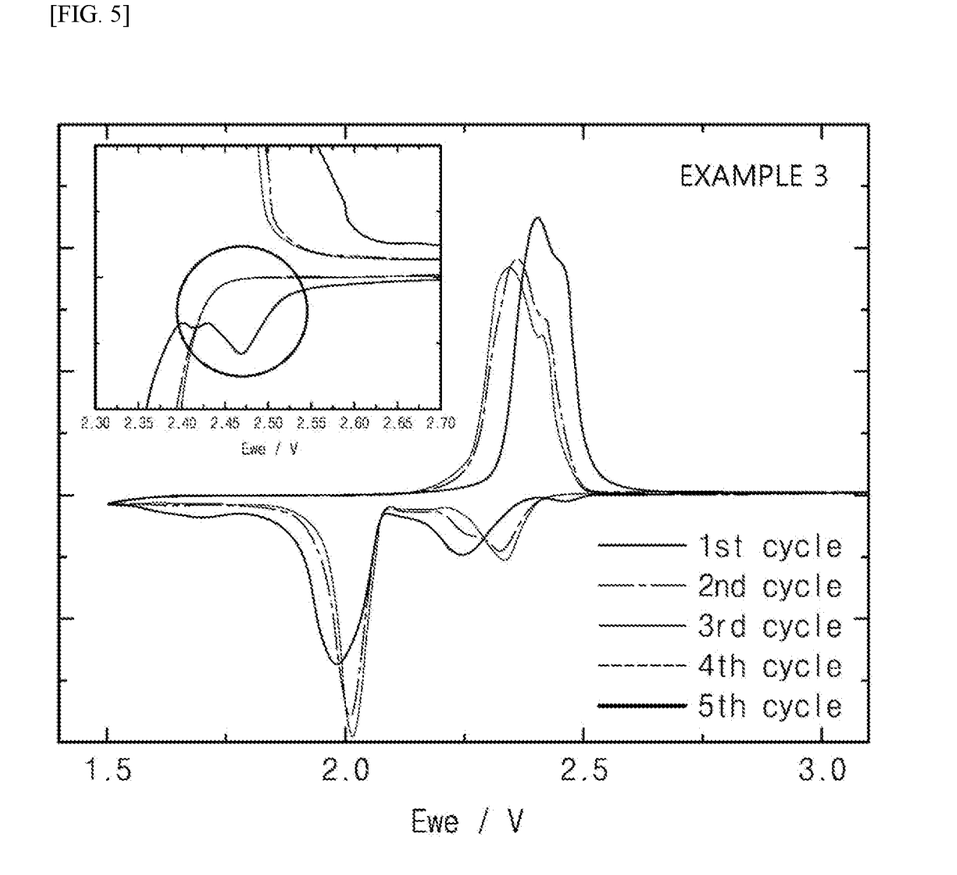
FIG. 5 is a CV graph of the lithium-sulfur battery according to Example 3 of the present invention.

FIG. 4 is a CV graph of the lithium-sulfur battery according to Comparative Example 1, and FIG. 5 is a CV graph of the lithium-sulfur battery according to Example 3 of the present invention.

Referring to FIGS. 4 and 5, the CV characteristics of the lithium-sulfur batteries according to Comparative Example 1 and Example 3 were measured according to the number of times of the charging/discharging.

At the first cycle, unlike the lithium-sulfur battery according to Comparative Example 1 including no electrolyte additive, an additional reaction was presented at 2.47 V in the lithium-sulfur battery according to Example 3 including the electrolyte additive (magnesium nitrate), and the additional reaction did not occur from the second cycle.

Figure 6:
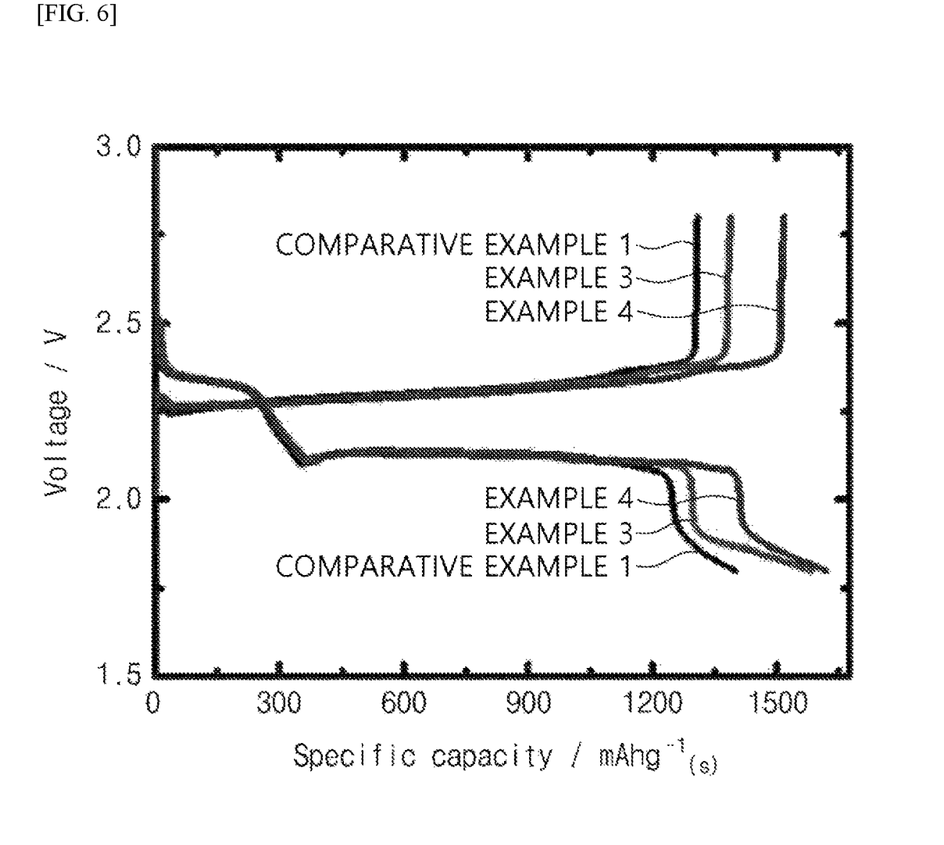
FIG. 6 is a graph of the measurement of discharge capacity characteristics of lithium-sulfur batteries according to Examples 3 and 4 of the present invention and Comparative Example 1.
Figure 7:
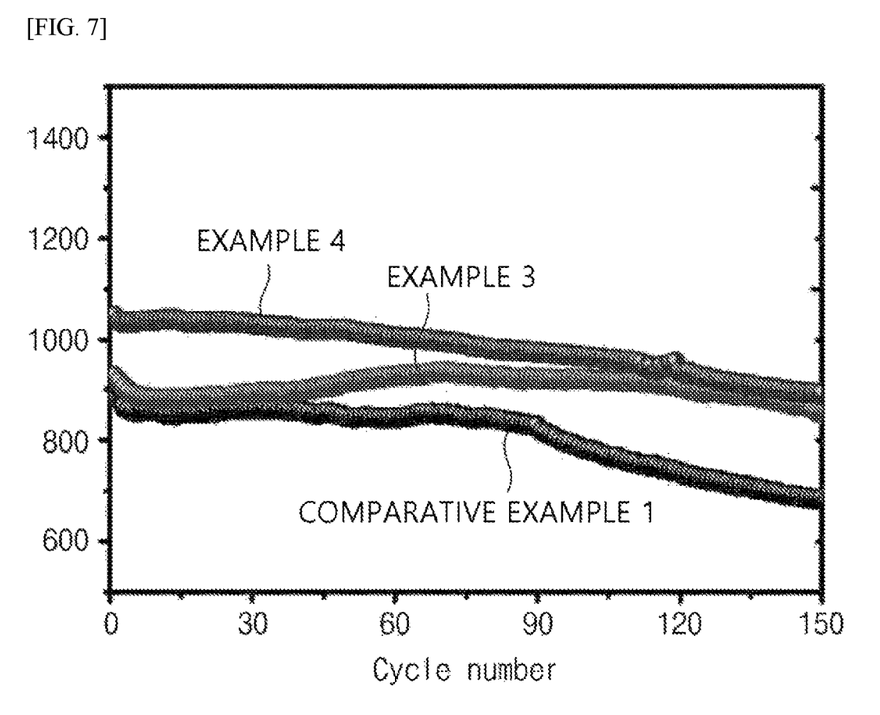
FIG. 7 is a graph of the measurement of lifespan characteristics of the lithium-sulfur batteries according to Examples 3 and 4 of the present invention and Comparative Example 1.
Figure 8:
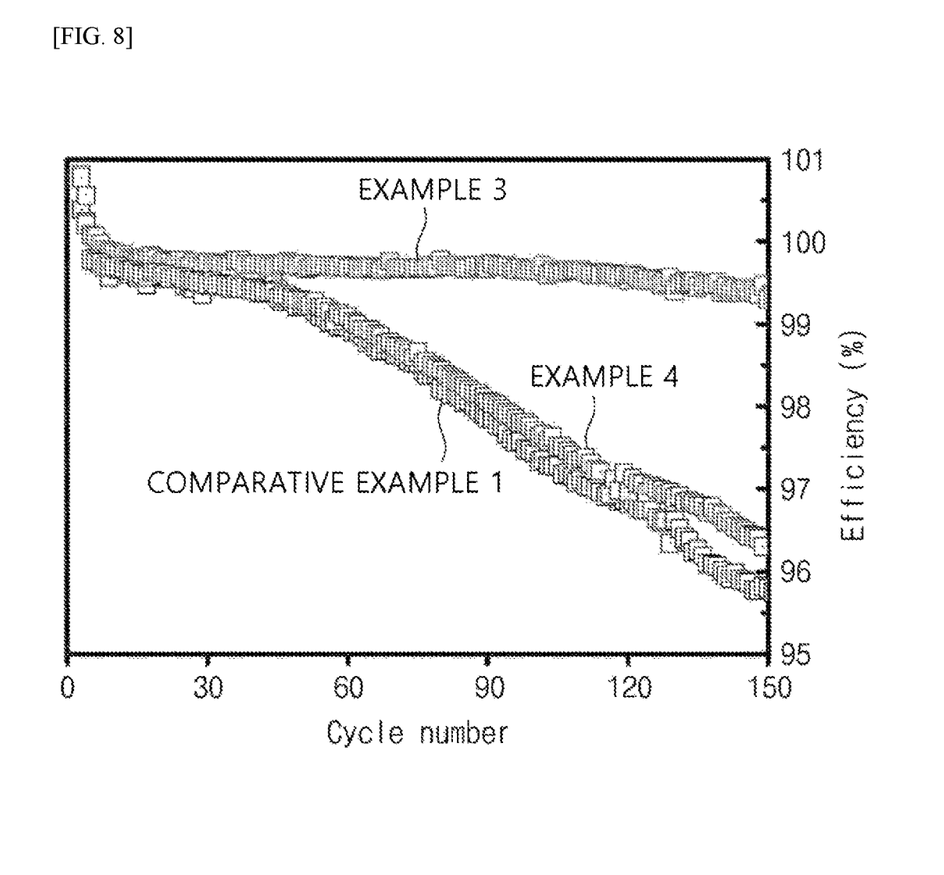
FIG. 8 is a graph of the charge/discharge efficiency of the lithium-sulfur batteries according to Examples 3 and 4 of the present invention and Comparative Example 1.

FIG. 6 is a graph of the measurement of discharge capacity characteristics of lithium-sulfur batteries according to Examples 3 and 4 of the present invention and Comparative Example 1, FIG. 7 is a graph of the measurement of lifespan characteristics of the lithium-sulfur batteries according to Examples 3 and 4 of the present invention and Comparative Example 1, and FIG. 8 is a graph of the charge/discharge efficiency of the lithium-sulfur batteries according to Examples 3 and 4 of the present invention and Comparative Example 1.

Referring to FIGS. 6 to 8, discharge capacity characteristics, lifespan characteristics, and charge/discharge efficiency of the lithium-sulfur batteries according to Examples 3 and 4 of the present invention and Comparative Example 1 were measured.

As illustrated in FIGS. 6 to 8, it can be seen that the capacities, the lifespan characteristics, and the charge/discharge efficiency of the lithium-sulfur batteries including the electrolyte including the magnesium nitrate according to Examples 3 and 4 are more excellent than the capacities, the lifespan characteristic, and the charge/discharge efficiency of the lithium-sulfur batteries including the electrolyte including no electrolyte additive (metal nitrate) according to Comparative Example 1.

Further, as illustrated in FIG. 8, it can be seen that in the case of using the electrolyte including 0.01 m of magnesium nitrate according to Example 3, the charge/discharge efficiency is considerably improved compared to the case of using the electrolyte including 0.03 m of magnesium nitrate according to Example 4.

In the foregoing, the exemplary embodiment of the present invention has been described in detail, but the scope of the present invention is not limited to the specific exemplary embodiment, and shall be interpreted by the accompanying claims. Further, it would be appreciated by those skilled in the art that many changes and modifications might be made without departing from the scope of the invention.

INDUSTRIAL APPLICABILITY

The electrolyte for the lithium-sulfur battery and the lithium-sulfur battery including the same according to the exemplary embodiment of the present invention are applicable to various industrial fields, such as a portable mobile device, an electric vehicle, and an energy storage device.

The invention claimed is:

1. A lithium-sulfur battery, comprising:
a cathode including a sulfur compound, a graphite conductive material, and a binder, wherein the sulfur compound, the graphite conductive material, and the binder are mixed at a 6:3:1 ratio;
a first electrolyte comprising:
a base electrolyte including lithium salt and an organic solvent; and
a first electrolyte additive,
wherein:
the first electrolyte additive includes indium nitrate;
the organic solvent is at least one of an annular carbonate material, a linear carbonate material, an ether-based material, 1,2-Dimethoxyethane, 1,3-Dioxolane, or dimethyl sulfoxide;
the annular carbonate material includes at least one of ethylene carbonate, propylene carbonate, butylene carbonate, vinylene carbonate, vinyl ethylene carbonate, or fluoroethylene carbonate;
the linear carbonate material includes at least one of dimethyl carbonate, diethyl carbonate, dipropyl carbonate, ethyl methyl carbonate, methyl propyl carbonate, methyl isopropyl carbonate, or ethyl propyl carbonate;
the ether-based material includes at least one of diethylene glycol dimethyl ether, triethylene glycol dimethyl ether, or tetraethylene glycol dimethyl ether; and
the first electrolyte additive is present at a concentration of from 0.01 m to 0.03 m in the first electrolyte;
an anode including lithium; and
a second electrolyte forming an anode protective layer on the anode to protect the anode while a charging/discharging operation is performed, the second electrolyte including a second electrolyte additive at a higher concentration than the first electrolyte additive in the first electrolyte, wherein the second electrolyte additive is different from the first electrolyte additive.

2. The lithium-sulfur battery of claim 1, wherein the lithium salt includes at least one of $LiPF_6$, $LiBF_4$, $LiClO_4$, $LiSbF_6$, $LiAsF_6$, $Li(NO_3)_3$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, LiCl, LiI, or $LiB(C_2O_4)_2$.

3. The lithium-sulfur battery of claim 1, wherein the lithium salt includes at least one of $LiSbF_6$, $Li(NO_3)_3$, $LiN(SO_2C_2F_5)_2$, $LiN(SO_3C_2F_5)_2$, $LiN(SO_2F)_2$, $LiC_4F_9SO_3$, $LiC_6H_5SO_3$, $LiAlO_2$, $LiAlCl_4$, LiCl, or $LiB(C_2O_4)_2$.

4. A lithium-sulfur battery, comprising:
a cathode including a sulfur compound, a graphite conductive material, and a binder;
a first electrolyte comprising:
a base electrolyte including lithium salt and an organic solvent;
a first electrolyte additive,
wherein:
the first electrolyte additive includes at least one of indium nitrate or aluminum nitrate;
the organic solvent is at least one of an annular carbonate material, a linear carbonate material, an ether-based material, 1,2-Dimethoxyethane, 1,3-Dioxolane, or dimethyl sulfoxide;
the annular carbonate material includes at least one of ethylene carbonate, propylene carbonate, butylene carbonate, vinylene carbonate, vinyl ethylene carbonate, or fluoroethylene carbonate;
the linear carbonate material includes at least one of dimethyl carbonate, diethyl carbonate, dipropyl carbonate, ethyl methyl carbonate, methyl propyl carbonate, methyl isopropyl carbonate, or ethyl propyl carbonate;
the ether-based material includes at least one of diethylene glycol dimethyl ether, triethylene glycol dimethyl ether, or tetraethylene glycol dimethyl ether; and
the first electrolyte additive is present at a concentration of from 0.01 m to 0.03 m in the first electrolyte; and
an anode including lithium, having an anode protective layer protecting the anode while a charging/discharging operation is performed, the anode protective layer formed from a second electrolyte including a second electrolyte additive at a higher concentration than the first electrolyte additive of the first electrolyte, wherein the second electrolyte additive is different from the first electrolyte additive.

5. The lithium-sulfur battery of claim 4, wherein the second electrolyte additive includes a magnesium nitrate.

6. The lithium-sulfur battery of claim 4, wherein the lithium salt includes $LiSbF_6$.

7. The lithium-sulfur battery of claim 4, wherein the lithium salt includes $Li(NO_3)_3$.

8. The lithium-sulfur battery of claim 4, wherein the lithium salt includes $LIN(SO_2C_2F_5)_2$.

9. The lithium-sulfur battery of claim 4, wherein the lithium salt includes $LiN(SO_3C_2F_5)_2$.

10. The lithium-sulfur battery of claim 4, wherein the lithium salt includes $LiN(SO_2F)_2$.

11. The lithium-sulfur battery of claim 4, wherein the lithium salt includes $LiC_4F_9SO_3$.

12. The lithium-sulfur battery of claim 4, wherein the lithium salt includes $LiC_6H_5SO_3$.

13. The lithium-sulfur battery of claim 4, wherein the lithium salt includes $LiAlO_2$.

14. The lithium-sulfur battery of claim 4, wherein the lithium salt includes $LiAlCl_4$.

15. The lithium-sulfur battery of claim 4, wherein the lithium salt includes LiCl.

16. The lithium-sulfur battery of claim 4, wherein the lithium salt includes $LiB(C_2O_4)_2$.

* * * * *